United States Patent [19]

Shikichi

[11] Patent Number: 5,146,442
[45] Date of Patent: Sep. 8, 1992

[54] METHOD AND APPARATUS FOR EFFECTING AT LEAST ONE OF TRACKING AND SERVO CONTROL WHEN AN ERROR SIGNAL PASSES A ZERO-CROSS POINT AND REACHES A PREDETERMINED NON-ZERO VALUE

[75] Inventor: Satoshi Shikichi, Tokyo, Japan

[73] Assignee: Canon Kabushiki Kaisha, Tokyo, Japan

[21] Appl. No.: 469,068

[22] Filed: Jan. 23, 1990

[30] Foreign Application Priority Data

Jan. 25, 1989 [JP] Japan .................................. 1-14052

[51] Int. Cl.$^5$ .............................................. G11B 7/00
[52] U.S. Cl. ..................... 369/44.29; 369/44.35; 369/44.27
[58] Field of Search ............ 250/201.5; 369/32, 44.29, 369/44.35, 44.27, 44.36; 360/77.02

[56] References Cited

U.S. PATENT DOCUMENTS 4,817,069 3/1989 Shigemori .............................. 369/32
4,975,895 12/1990 Yanagi ............................. 369/44.29

*Primary Examiner*—Robert L. Richardson
*Attorney, Agent, or Firm*—Fitzpatrick, Cella, Harper & Scinto

[57] ABSTRACT

In an optical information recording and/or reproducing apparatus, tracking and/or focusing error signals from relected light which are caused when a light spot is irradiated onto an optical recording medium are detected. Tracking and/or focusing servo circuits in the apparatus cause an objective lens to follow the medium on the basis of the result of the detection of the tracking and/or focusing error signals. When it is detected that the tracking and/or focusing error signals have reached a target value which is previously set to exceed a zero-cross point or a zero-cross level at the signal level, the tracking and/or focusing servo circuit is closed and the tracking and/or focusing servo is pulled in.

8 Claims, 6 Drawing Sheets

METHOD AND APPARATUS FOR EFFECTING AT LEAST ONE OF TRACKING AND SERVO CONTROL WHEN AN ERROR SIGNAL PASSES A ZERO-CROSS POINT AND REACHES A PREDETERMINED NON-ZERO VALUE

BACKGROUND OF THE INVENTION

1. Field of the Invention

The present invention relates to an optical information recording and/or reproducing apparatus and, more particularly, to an optical information recording and/or reproducing apparatus for recording information or an optical information recording medium and/or reproducing the information recorded on the optical information recording medium and/or erasing the information recorded on the optical information recording medium by relatively moving a light spot to tracks on the optical information recording medium while tracking and/or focusing the light spot relative to a track.

2. Related Background Art

Hitherto, various kinds of disk-shaped mediums, card-shaped mediums, tape-shaped mediums, and the like have been known as forms of optical information recording media for recording information by using light or for reading out the recorded information. Among them, in the case of an optical information recording medium in the form of a card (hereinafter, referred, to as an "optical card"), a large demand is expected, since the card is a small and light-weight information recording medium having a large recording capacity which is convenient to carry.

FIG. 5 is a schematic plan view for explaining a construction of the optical card.

In the diagram, an information recording area is provided in an optical card 101. Track selection areas 104a and 104b are provided in both edge portions of the area 102. Information tracks 103 are provided in parts of the information recording area 102 and track selection areas 104a and 104b. Information is recorded on the information tracks 103. Reference numeral 105 indicates a home position of a light spot.

Information is recorded on the optical card 101 as an optically detectable recording pit train (information track) by scanning the information track by a light beam modulated in accordance with recording information and converged to a microspot.

In this case, to accurately record the information without causing any trouble such as intersection of information tracks or the like, the irradiating position of the light spot needs to be controlled in the direction perpendicular to the scanning direction in the optical card surface (auto tracking, hereinafter, referred to as "AT"). On the other hand, to irradiate the light beam as a microspot of a stable size irrespective of any bending or mechanical errors of the optical card, the light spot needs to be controlled in the direction perpendicular to the optical card surface (auto focusing, hereinafter, referred to as "AF"). In addition, the above AT and AF are also necessary for reproduction.

The AT operation will now be simply explained hereinbelow. The detailed description of the AF operation will be made later.

Although various kinds of methods for AF are known, an astigmatism method and a knife edge method can be mentioned as two typical methods among them.

The astigmatism method is a method of detecting a focusing error by using an optical part for generating astigmatism and has been disclosed in detail in JP-B-53-39123.

On the other hand, the knife, edge method is a method whereby a knife edge is arranged to correspond a width of an optical passage of the converged light returned from a recording medium and a focusing error is detected by detecting a movement amount of a light spot image on a photo-sensitive element.

Hitherto, to execute such an AF operation, there has been performed a pull-in operation such that an objective lens is first moved in the, focusing servo OFF state until the light spot reaches an in-focus state on the recording surface of an optical card, and after the in-focus state is obtained, the focusing servo is made operative. (In general, before the start of the recording and reproducing operations of information, the objective lens is held in an initial state in which its focal point deviates from the recording surface of the optical card.)

Since a dynamic range of a focusing error signal is small enough to be tens of $\mu m$, upon execution of the AF, the pull-in operation is necessary to pull in the focusing servo within the dynamic range.

The in-focus state can be obtained in a manner such that the light reflected (or transmitted) from a recording pit train on the optical card is detected by a photoelectric conversion element, an electric focusing signal from the photoelectric conversion element is amplified to obtain a voltage value (V), a relative position of an objective lens from the in-focus state is determined on the basis of the voltage value, and the objective lens is moved on the basis of the relative position.

FIG. 6A is a characteristic graph showing the relative distance between an optical card and a light spot in a case when the in-focus position is used as a reference. FIG. 6B is a characteristic graph showing a change in the voltage value which is obtained by amplifying an electric focusing signal upon a normal operation. As shown by a broken line in FIG. 6A, when the objective lens is moved near the in-focus state, as shown in FIG. 6B, the voltage obtained by amplifying the electric focusing signal changes in the form of an S-character shape (what is called an S-shaped curve) (time $t_{11}$ to time $t_{16}$).

Hitherto, to detect the in-focus state and to pull in the servo, a servo loop is closed when the voltage value V is set to 0 V (a zero-cross level or a zero-cross point) (at time $t_{15}$).

However, in the conventional AF operation, there is a drawback such that the servo loop is closed even when the, voltage value V is set to 0 V because of the objective lens being away from the in-focus position due to the occurrence of a vibration or electric noises. Such a state will now be described hereinbelow with reference to FIG. 7.

FIG. 7 is a characteristic graph showing a change in the voltage value obtained by amplifying the electric focusing signal in a case when a vibration has occurred.

As shown in FIG. 7, when the objective lens is moved toward the in-focus position from time $t_{10}$, the voltage value V is set to 0 V until time $t_{11}$ and is set to the negative maximum value at time $t_{12}$ and rises after that.

When a vibration occurs at time $t_{13}$ and the distance between the optical card and the light spot changes in such a direction as to be away from the in-focus position as shown by a solid line in FIG. 6A, the voltage value V is set to the same value of 0 V at time $t_{14}$ as that at time $t_{11}$ as shown in FIG. 7. In the conventional AF operation, the servo loop is closed at that time point. However, since the light spot is away from the in-focus position in such a state, the pull-in operation of the servo fails.

The reason why the servo loop is not closed, although the voltage value V is held to 0 V for the time interval from $t_{10}$ to $t_{11}$ in FIG. 7, is because 0 V, which is detected after the voltage value V has exceeded a predetermined threshold value different from 0 V after the start of the pull-in operation, is used to decide the in-focus position.

SUMMARY OF THE INVENTION

It is an object of the invention to provide an optical information recording and/or reproducing apparatus which can stably pull in the tracking and/or focusing servo operations without being influenced by distance, in consideration of the above-noted problems.

The above-noted object can be accomplished by an apparatus in which a light beam emitted from a light source is converged by an objective lens to form a light spot, the light spot being irradiated onto tracks on an optical information recording medium while performing tracking and/or focusing of the light spot, and thereby recording and/or reproducing information, wherein the apparatus includes:

detecting means for detecting tracking and/or focusing error signals from the reflected light which are caused when the light spot is irradiated onto the medium;

tracking, and/or focusing servo circuits for causing the objective lens to follow the medium on the basis of the detection result of the detecting means; and tracking and/or focusing servo pull-in means for detecting that the tracking and/or focusing error signals have reached a target value exceeding a zero-cross point and for closing the tracking and/or focusing servo circuit.

Further explaining in detail, in a case when the focusing signal and/or tracking signal which are obtained from the light reflected (or transmitted) from a recording pit train of the optical information recording medium change in the form of an S-shape, the light spot passes a target position on the track and/or a target position in the in-focus state (zero-cross level or zero-cross point of the signal voltage) for the time interval when the signal voltage value changes from the minimum value to the maximum value (or from the maximum value to the minimum value).

According to the invention, after the voltage values of the focusing, signal and/or tracking signal have been set to the zero-cross level, when they are set to a voltage $V_1$, that is, after the light spot has passed the target position on the track and/or the target position in the in-focus state and the target positions can be confirmed, the servo loop is closed, thereby enabling the servo to be accurately pulled in.

DETAILED DESCRIPTION OF THE PREFERRED EMBODIMENT

An embodiment of the present invention will now be described in detail hereinbelow with reference to the drawings.

Figure 5:
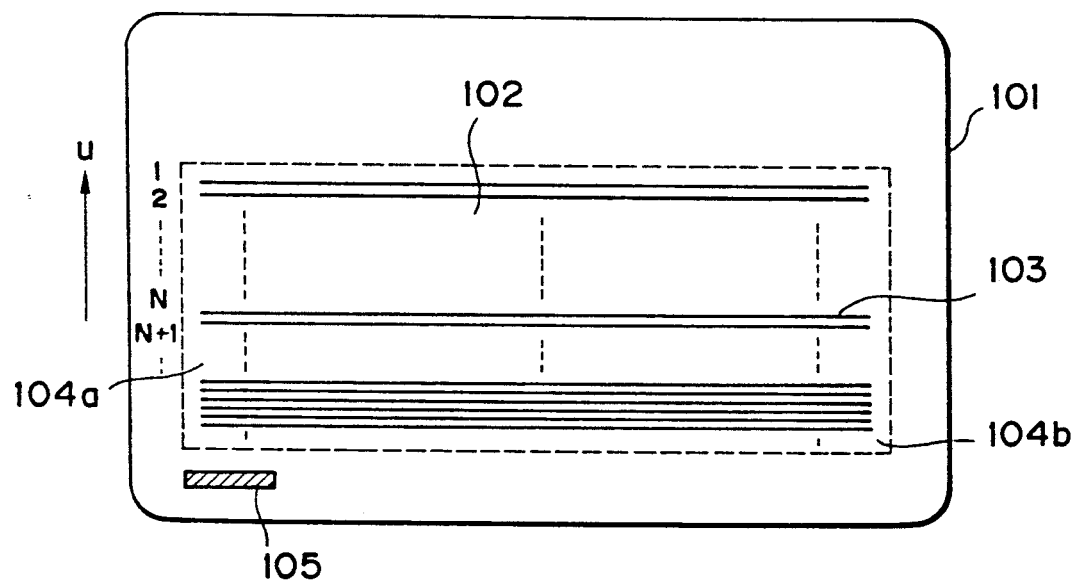
FIG. 5 is a schematic plan view for explaining a construction of an optical card.
Figure 6A:
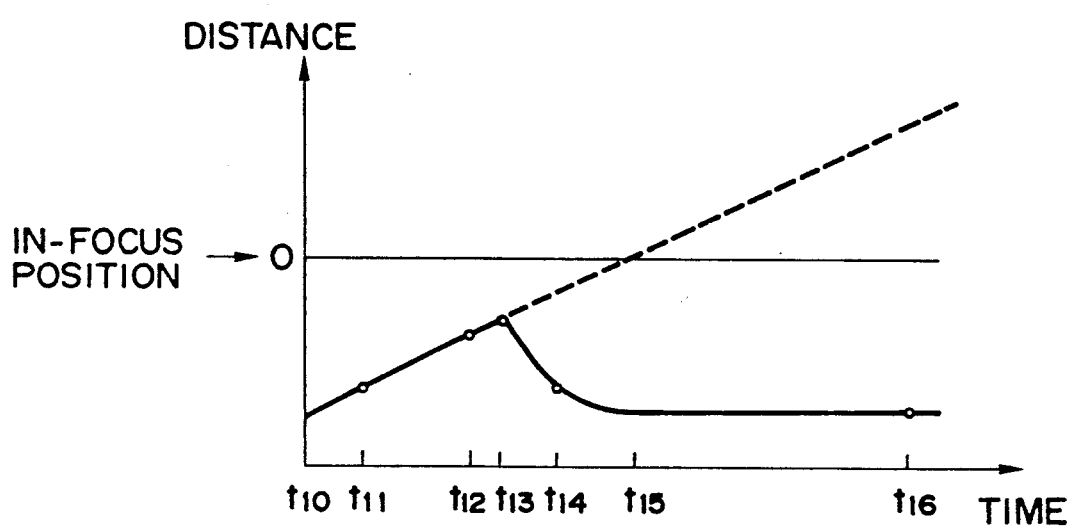
FIG. 6A is a characteristic graph showing the relative distance between the optical card and the light spot in a case when the in-focus position is used as a reference.
Figure 6B:
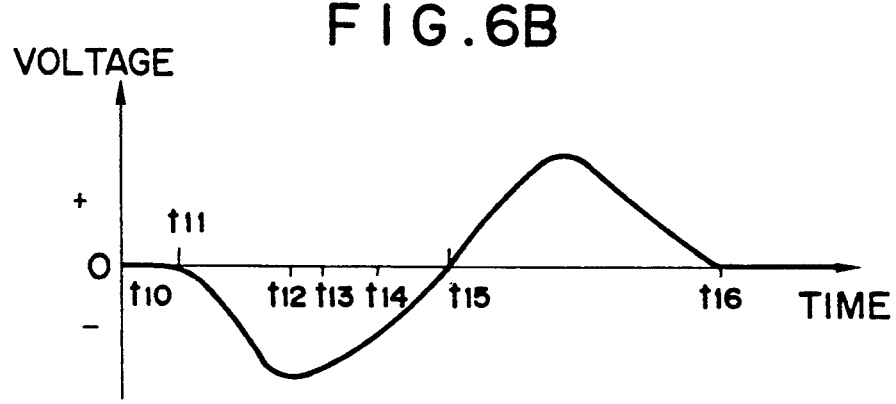
FIG. 6B is a characteristic graph showing a change in voltage value which is obtained by amplifying an electric focusing signal upon a normal operation.
Figure 7:
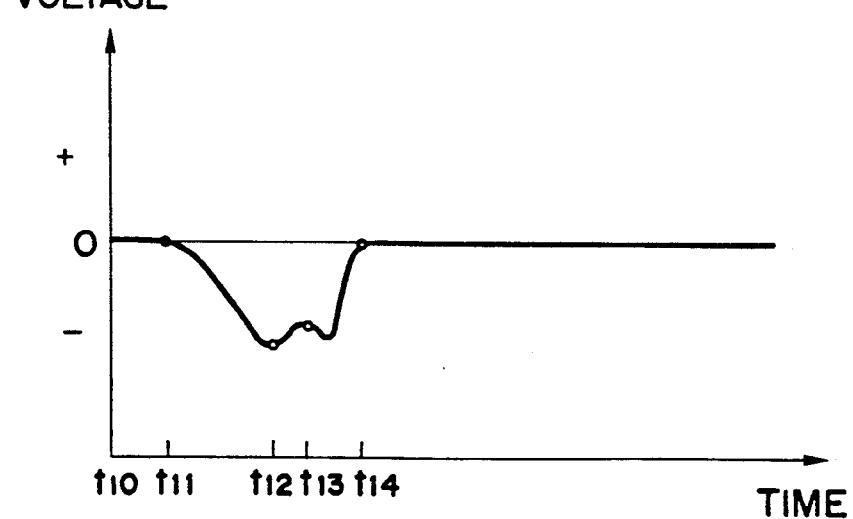
FIG. 7 is a characteristic graph showing a change in voltage value which is obtained by amplifying an electric focusing signal when a vibration has occurred.

The AF operation will now be described hereinbelow. The invention also can be similarly used with respect to the AT operation. Although the optical card shown in FIG. 5 is used as an optical information recording medium, the invention is not limited to such a card-shaped medium.

Figure 1:
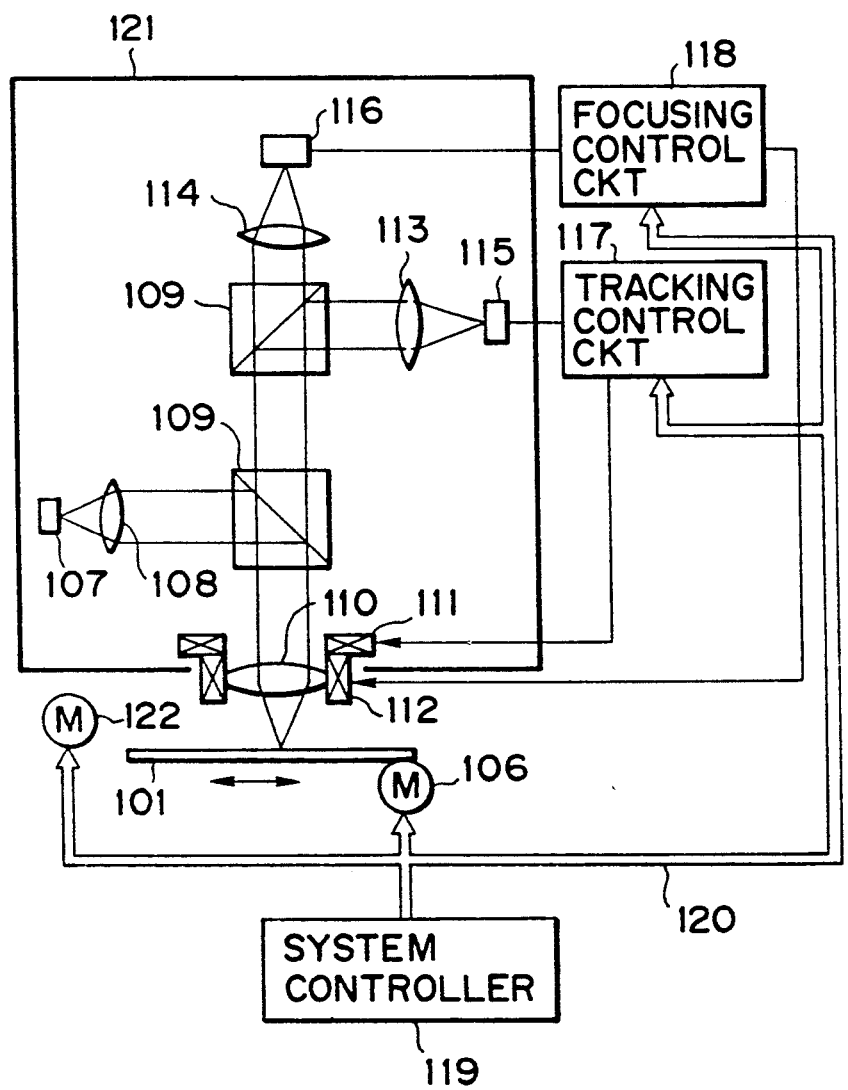
FIG. 1 is a schematic constructional diagram of an embodiment of an optical information recording and/or reproducing apparatus of the present invention.

FIG. 1 is a schematic constructional diagram of an embodiment of an optical information recording and/or reproducing apparatus of the invention.

As shown in the diagram, reference numeral 106 denotes a motor to drive the optical card 101 in the directions indicated by the double-head arrow in the diagram. Reference numeral 107 indicates a light source such as a semi-conductor laser; 108 a collimating lens for converting the light from the light source 107 into a parallel light beam; 109 a beam splitter; 110 an objective lens; 111 a tracking coil; 112 a focusing coil; reference numerals 113 and 114 indicate condenser lenses; 115 and 116 photoelectric conversion elements; reference numeral 117 indicates a tracking control circuit; and 118 a focusing control circuit. On the basis of a tracking signal and a focusing signal which are detected by the photoelectric, conversion elements 115 and 116, current is supplied to the tracking coil 111 and focusing coil 112 in response to commands from the control circuits 117 and 118, thereby moving the objective lens 110 and executing the AT and AF operations. On the other hand, reference numeral 119 denotes a system controller to control the information recording and/or reproducing apparatus and 120 represents a group of various control signals which are output from the system controller 119. Although signals other than the control signals 120 are also output from the controller 119, they are not shown here. Reference numeral 121 denotes an optical head and 122 indicates a drive motor to move the optical head in the direction indicated by an arrow u in FIG. 5.

The light from the light source 107 is converted into a parallel light beam by the collimating mating lens 108 and transmitted through the beam splitter 109. After that, the light beam is converged onto a recording track on the optical card 101 by the objective lens 110. The light reflected by the recording track is now transmitted through the beam splitter 109 and divided into two light beams by the beam splitter 109. The two light beams are then converged onto the photoelectric conversion element 115 to detect a tracking signal and onto the photoelectric conversion element 116 to detect a focusing signal by the condenser lenses 113 and 114, respectively. The signals obtained by the photoelectric conversion elements 115 and 116 are transferred to the tracking control circuit 117 and focusing control circuit 118, respectively. The tracking control circuit 117 and focusing control circuit 118 use the transferred signals as a tracking error signal and a focusing error signal, respectively, and allow current to flow through the tracking coil 111 and focusing coil 112, thereby moving the objective lens 110 and executing the AT and AF operations.

Figure 2:
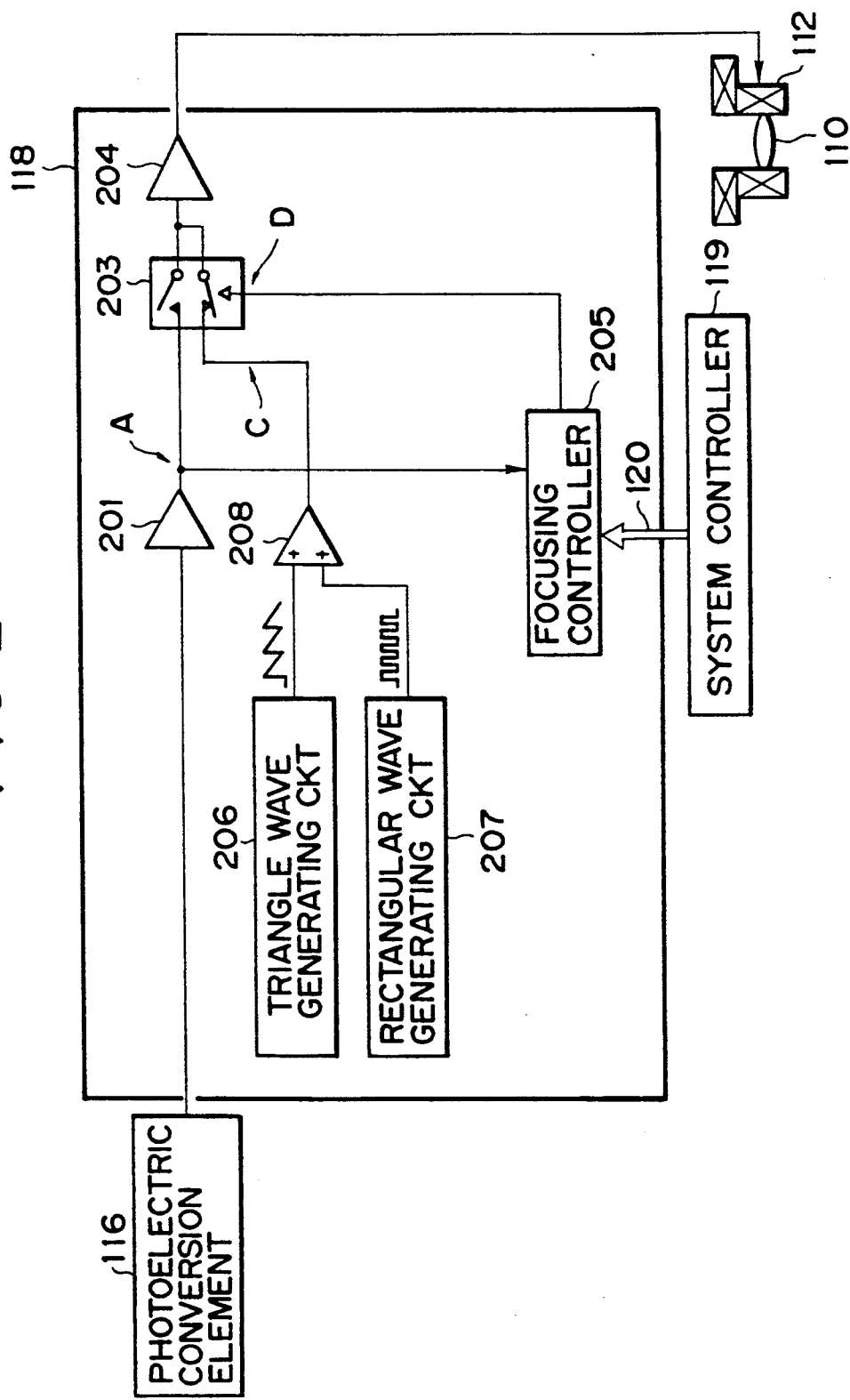
FIG. 2 is a schematic constructional diagram of a focusing control circuit of the optical information recording and/or reproducing apparatus shown in FIG. 1.

FIG. 2 is a schematic constructional diagram of the focusing control circuit 118 as a characteristic part of the optical information recording and/or reproducing apparatus of the invention.

In the diagram, reference numeral 201 denotes an amplifier to amplify the electric focusing signal from the photoelectric conversion element 116 to a proper voltage. Reference numeral 203 indicates an analog switch. An output of the amplifier 201 is input to one input terminal of the switch 203. An output of an adding circuit 208 is input to the other input terminal of the switch 203 through point C. One of the input terminals of the switch 203 is selected by the signal from a focusing controller 205. Reference numeral 206 indicates a triangle wave generating circuit and 207 represents a rectangular wave generating circuit. Two outputs of the generating circuits 206 and 207 are added by the adding circuit 208. Reference numeral 204 denotes a driver for receiving a signal from the analog switch 203 and supplies a drive signal current to the focusing coil 112. Reference numeral 205 denotes the focusing controller for receiving the signals 120 from the system controller 119 and for controlling the whole focusing control circuit 118. FIG. 2 shows a case when the signal is input from the focusing controller 205 to only the analog switch 203. However, signals (not shown) other than such a signal are also output from the focusing controller 205.

Figure 3A:
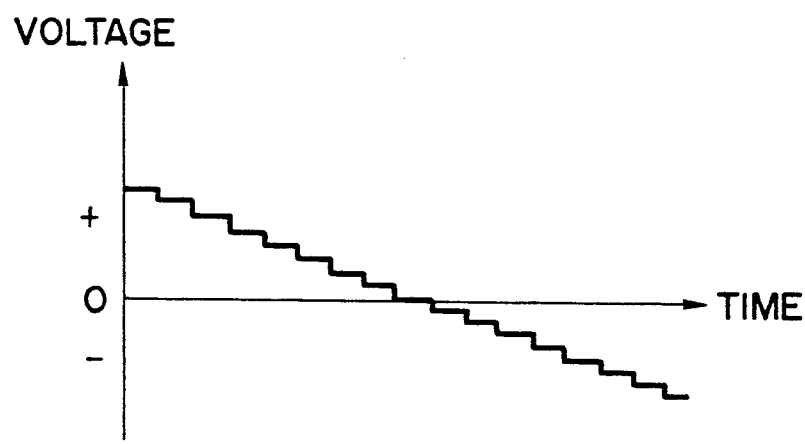
FIGS. 3A and 3B are diagrams showing time-dependent changes in voltages at points C and A in the focusing, control circuit shown in FIG. 2.
Figure 3B:
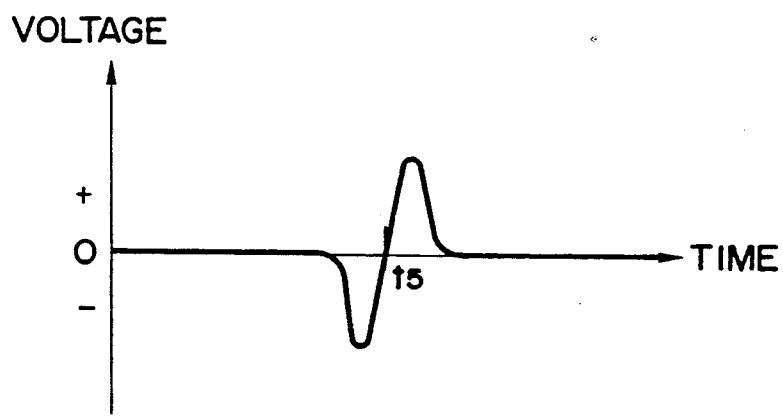

FIGS. 3A and 3B show time-dependent voltage changes at points C and A in the focusing control circuit shown in FIG. 2.

The pull-in operation of the focusing servo will now be described hereinbelow with reference to FIGS. 2, 3A, and 3B.

First, as shown in FIG. 2, a command to start the pull-in operation of the focusing servo is transmitted from the system controller 119 to the focusing controller 205 by the signal 120. On the basis of the above command, the focusing controller 205 controls the switching state of the analog switch 203 by a signal D in a manner such that the contact at point A is opened and the contact at point C is closed.

The objective lens 110 is moved in the above state by an output of the adding circuit 208.

In a case when the portion to drive the objective lens 110 is of the sliding type (whose elastic coefficient is too small to be ignored), a force (a resistive force to static friction) which is necessary to start the movement of the objective lens is larger than a force (almost all of this force comprises a resistive force to dynamic friction) which is necessary to continuously move the objective lens. In such a case, if the operator desires to move the objective lens 110 by only the triangle wave generating circuit 206, the motion of the lens 110 becomes irregular. Therefore, in general, a method is used whereby an output of the rectangular wave generating circuit 207 is multiplexed to the output of the triangle wave generating circuit 206, the objective lens is always reciprocated by a microamount by a voltage waveform as shown in FIG. 3A and is moved, thereby reducing the static frictional force.

Although the sliding type has been used as a portion to drive the objective lens 110 as mentioned above, the invention is not limited to such a type.

At this time, the system controller 119 controls the focusing controller and, at the same time, it also controls a light source driver (not shown) to control the light source 107, thereby allowing a laser beam to be irradiated onto the optical card.

The photoelectric conversion element 116 detects the reflected light which is caused at this time, thereby searching the in-focus position. Now, explaining in more detail, when the objective lens is moved relative to the optical card, at an area near the focal point of the objective lens with respect to the optical card, the voltage at point A based on the output signal of the photoelectric conversion element 116 changes in the form of an S-shape (what is called an S-shaped curve) as shown in FIG. 3B.

Such a signal (voltage value) is transferred to the focusing controller 205. In the focusing controller 205, the above signal is converted into the digital signal by an A/D converter (not shown) and the digital signal is compared with a threshold value signal (digital signal) which has previously been input and set, thereby discriminating whether the voltage value has reached a threshold value or not.

As already mentioned above, in the AF operation of the conventional optical information recording and/or reproducing apparatus, the servo loop is closed at time $t_5$ of the S-shaped curve (zero-cross point) to pull in the servo operation. According to the invention, the servo loop is closed at a time point exceeding time $t_5$ of the S-shaped curve. The focusing controller 205 detects by the foregoing method that the voltage value at point A has reached a threshold value $V_a(V)$ exceeding 0 V after time $t_5$. Then, the controller 205 sends the signal D to the analog switch 203, the contact at point A is closed, and the contact at point C is opened, thereby pulling in the focusing servo operation.

The above state will now be described in detail hereinbelow with reference to FIGS. 4A and 4B.

Figure 4A:
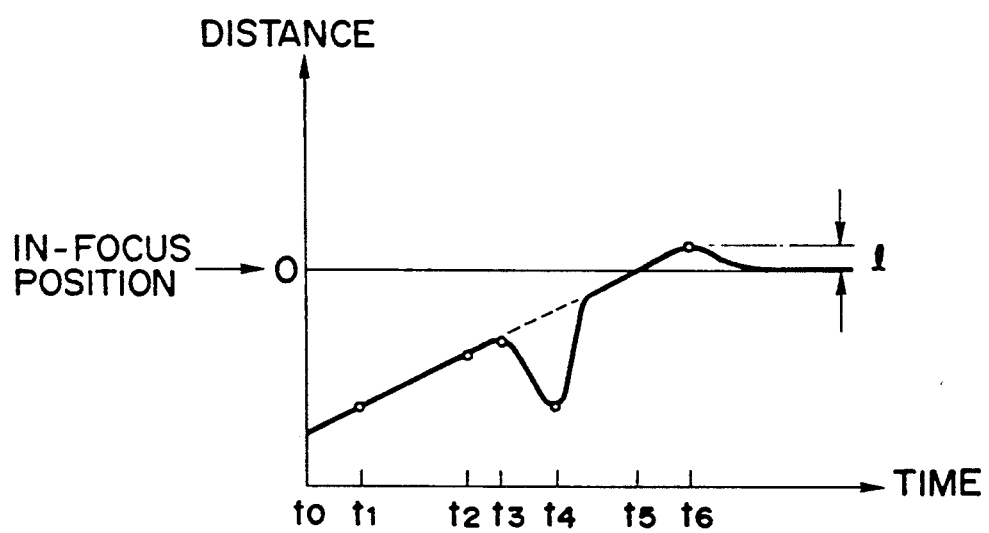
FIG. 4A is a characteristic graph showing the relative distance between an optical card and a light spot in a case when the in-focus position is used as a reference.

FIG. 4A is a characteristic graph showing the relative distance between the optical card and the light spot in a case when the in-focus position is used as a reference.

Figure 4B:
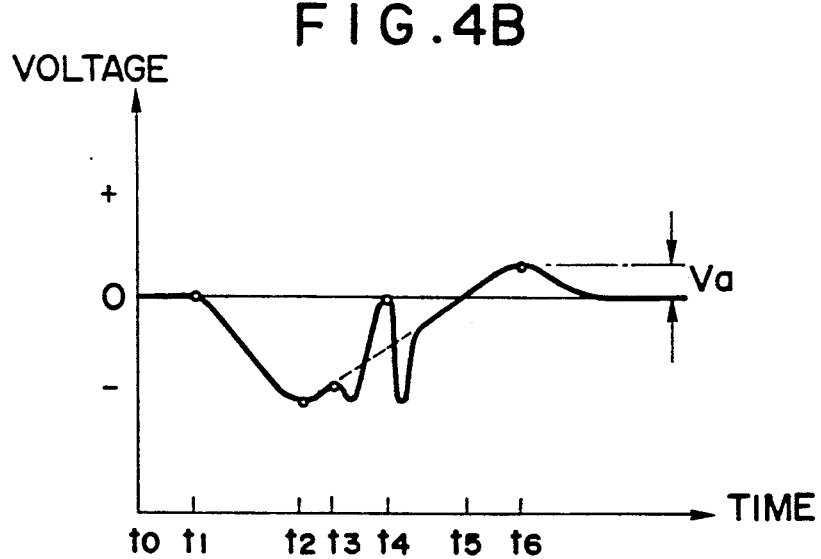
FIG. 4B is a characteristic graph showing a change in voltage value which is obtained by amplifying an electric focusing signal when a vibration has occurred.

FIG. 4B is a characteristic graph showing a change in voltage value which is obtained by amplifying the electric focusing signal when a vibration has occurred.

As shown in FIG. 4B, when the objective lens is moved toward the in-focus position from time $t_0$, the voltage value V is set to 0 V until time $t_1$ and is set to the maximum negative value at time $t_2$ and rises after that.

Next, at time $t_3$, when the vibration occurs and the distance between the optical card and the light spot changes in a direction such as to be away from the in-focus position as shown by a solid line in FIG. 4A, at time $t_4$, the voltage value V is set to the same value of 0 V as that at time $t_1$. In the invention, in such a state, the servo loop is not closed, but the movement of the objective lens is continued. When the voltage at point A is set to 0 V at time $t_5$ and the voltage at point A exceeds 0 V at time $t_6$ and is set to a voltage value $V_a$ having the polarity inverse to the polarity of the voltage value before it exceeds 0 V, that is, when the distance between the optical card and the light spot is away from the in-focus position by only a distance of l, the servo loop is closed and the servo is pulled in.

The value of $V_a$ is set so as to have a polarity inverse to the polarity (positive/negative) which is held for the time interval from the start of the pull-in to the time point when the voltages of the tracking and/or focusing error signals exceed 0 V (zero-cross points) and is set to the peak value (maximum or minimum value) or less of the voltages of the tracking and/or focusing error signals at such an inverse polarity.

If there is a possibility such that the offset voltage is generated in the signal A, it is preferable to also consider the condition of $V_a > V_{offset}$ ($V_{offset}$: offset maximum value).

As mentioned above, if the servo loop is pulled in by the above method, the AF/AT servo operations can be accurately and stably pulled in without being influenced by a disturbance.

The present invention is not limited to the foregoing embodiment, but many modifications and variations are possible within the spirit and scope of the appended claims of the invention.

What is claimed is:

1. An optical information recording/reproducing apparatus in which a light beam from a light source is converged into a spot-like shape by an objective lens onto a recording medium to thereby effect at least one of recording of information on and reproducing of information from the recording medium by using the spot, said apparatus comprising:

detecting means for detecting a tracking error signal indicative of positional deviation between the light spot and a track on the recording medium by using light reflected from the medium caused when the light spot irradiates the medium;

an actuator for driving the objective lens to move the light spot relative to the track;

a tracking servo circuit for controlling said actuator on the basis of the tracking error signal detected by said detecting means so as to correct the positional deviation; and a tracking servo pull-in circuit for causing said actuator to be driven while opening said tracking servo circuit and closing said tracking servo circuit when the tracking error signal passes a zero cross-point and reaches a predetermined, non-zero value.

2. An apparatus according to claim 1, wherein the predetermined value is set to be a value between zero and a peak value of the tracking error signal.

3. An apparatus according to claim 1, wherein the predetermined value is set to be greater than an offset value of the tracking error signal.

4. An optical information recording/reproducing apparatus in which a light beam from a light source is converged into a spot-like shape by an objective lens onto a recording medium to thereby effect at least one of recording of information on and reproducing of information from the recording medium by using the light spot, said apparatus comprising:

detecting means for detecting a focusing error signal indicative of focus deviation of the light spot on a recording surface of the recording medium by using light reflected from the medium when the light spot irradiates the medium;

an actuator for driving the objective lens to move the light spot relative to the recording surface;

a focusing servo circuit for controlling said actuator on the basis of the focusing error signal detected by said detecting means so as to correct the focus deviation; and a focusing servo pull-in circuit for causing said actuator to be driven while opening said focusing servo circuit and closing said focusing servo circuit when the focusing error signal passes a zero-cross point and reaches a predetermined, non-zero value.

5. An apparatus according to claim 4, wherein the predetermined value is set to be a value between zero and a peak value of the focusing error signal.

6. An apparatus according to claim 4, wherein the predetermined value is set to be greater than an offset value of the focusing error signal.

7. A method of effecting at least one of optically recording information on and optically reproducing information from a recording medium by using a light spot obtained by converging a light beam from a light source by an objective lens, said method comprising:

detecting a tracking error signal indicative of positional deviation between the light spot and a track on the recording medium by using light reflected from the recording medium caused when the light spot irradiates the medium;

providing a tracking servo circuit for causing the light spot to follow the track on the basis of the tracking error signal detected in said detecting step; and performing tracking servo pull-in to cause the objective lens to move in a direction perpendicular to an optical axis of the objective lens while opening the tracking servo circuit and closing the tracking servo circuit when the tracking error signal passes a zero-cross point and reaches a predetermined, non-zero value.

8. A method of effecting at least one of optically recording information on and optically reproducing information from a recording medium by using a light spot obtained by converging a light beam from a light source by an objective lens, said method comprising:

detecting a focusing error signal indicative of focus deviation of the light spot relative to a recording surface of the recording medium by using light reflected from the recording medium when the light spot irradiates the medium;

providing a tracking servo circuit for causing the light spot to be in an in-focus state relative to the recording surface on the basis of the focusing error signal detected in said detecting step; and performing focusing servo pull-in to cause the objective lens to move in a direction parallel to an optical axis of the objective lens while opening the focusing servo circuit and closing the focusing servo circuit when the focusing error signal passes a zero-cross point and reaches a predetermined non-zero, value.

* * * * *

UNITED STATES PATENT AND TRADEMARK OFFICE
CERTIFICATE OF CORRECTION

PATENT NO. : 5,146,442
DATED : September 8, 1992
INVENTOR(S) : Satoshi Shikichi

It is certified that error appears in the above-identified patent and that said Letters Patent is hereby corrected as shown below:

COLUMN 1

Line 61, "AT" should read --AF--.

COLUMN 2

Line 4, "correspond" should read --correspond to--; and
    Line 11, "the," should read --the--.

COLUMN 3

Line 53, ",of the focusing," should read --of the focusing--.

COLUMN 7

Line 5, "a" should read --the-- and "the" should read --a--.

Signed and Sealed this

Second Day of November, 1993

Attest:

BRUCE LEHMAN

Attesting Officer      Commissioner of Patents and Trademarks